United States Patent
Barber et al.

(10) Patent No.: US 9,731,315 B2
(45) Date of Patent: Aug. 15, 2017

(54) VACUUM DIP COATING APPARATUS

(71) Applicant: GENERAL ELECTRIC COMPANY, Schenectady, NY (US)

(72) Inventors: John H. Barber, Fergus (CA); Hai Yang, Shanghai (CN); Chen Wang, Shanghai (CN); Zhixun Liu, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/759,359

(22) PCT Filed: Dec. 19, 2013

(86) PCT No.: PCT/US2013/076443
§ 371 (c)(1),
(2) Date: Jul. 6, 2015

(87) PCT Pub. No.: WO2014/107320
PCT Pub. Date: Jul. 10, 2014

(65) Prior Publication Data
US 2015/0336126 A1    Nov. 26, 2015

(30) Foreign Application Priority Data
Jan. 7, 2013    (CN) .......................... 2013 1 0005454

(51) Int. Cl.
*B05C 3/02* (2006.01)
*B05C 3/09* (2006.01)
(Continued)

(52) U.S. Cl.
CPC .................. *B05C 3/02* (2013.01); *B05C 3/09* (2013.01); *B05C 3/10* (2013.01); *B05C 3/109* (2013.01);
(Continued)

(58) Field of Classification Search
None
See application file for complete search history.

(56) References Cited

U.S. PATENT DOCUMENTS 4,144,836 A * 3/1979 Bernath .................... B05C 3/09
118/421
5,512,098 A * 4/1996 French ..................... B27K 3/08
118/423
(Continued)

FOREIGN PATENT DOCUMENTS

CN    1198180 A    11/1998
DE    1621395 A1    6/1971
(Continued)

OTHER PUBLICATIONS

Takeshi, Y. JP 2005161268 A, Machine Translation, JPIatPat, originally published 2005, p. 1-16.*
(Continued)

*Primary Examiner* — Binu Thomas
(74) *Attorney, Agent, or Firm* — GE Global Patent Operation

(57) ABSTRACT

There is provided a dip coating apparatus that includes a sealed case assembly for containing at least one workpiece to be coated. The dip coating apparatus also includes an air pump communicated with the sealed case assembly, for pumping air from the sealed case assembly and injecting air into the sealed case assembly. Further, the dip coating apparatus includes a fresh coating solution container containing a coating solution, which is communicated with the sealed case assembly, for injecting the coating solution to the sealed case assembly and a recycle coating solution container, which is communicated with the sealed case assembly, for retrieving the coating solution from the sealed case assembly.

14 Claims, 16 Drawing Sheets

(51) Int. Cl.
*B05C 13/00* (2006.01)
*B05D 1/18* (2006.01)
*B05C 3/10* (2006.01)
*B05C 9/08* (2006.01)
*B05C 3/109* (2006.01)

(52) U.S. Cl.
CPC ............... *B05C 9/08* (2013.01); *B05C 13/00* (2013.01); *B05D 1/18* (2013.01)

(56) References Cited

U.S. PATENT DOCUMENTS

| | | | | |
|---|---|---|---|---|
| 5,597,412 | A * | 1/1997 | Grilletto | H05K 3/0088 118/407 |
| 6,080,363 | A * | 6/2000 | Takahashi | G01N 1/312 118/625 |
| 6,277,442 | B1 * | 8/2001 | Beaumont | G03F 7/16 118/428 |
| 6,455,097 | B1 * | 9/2002 | Berclaz | B05C 3/09 118/406 |
| 6,641,711 | B2 | 11/2003 | Sakamoto et al. | |
| 7,604,842 | B2 | 10/2009 | Shida et al. | |
| 8,048,478 | B2 | 11/2011 | Hirokawa et al. | |
| 2002/0150832 | A1 * | 10/2002 | Kinoshita | B05C 3/09 118/400 |
| 2006/0198947 | A1 * | 9/2006 | Lee | B05D 7/22 118/50 |
| 2009/0214955 | A1 | 8/2009 | Utsunomiya et al. | |
| 2011/0024287 | A1 | 2/2011 | Zheng et al. | |
| 2012/0167921 | A1 * | 7/2012 | Donnay | B05C 3/109 134/21 |
| 2012/0171361 | A1 | 7/2012 | Macdonald | |
| 2012/0214040 | A1 | 8/2012 | Tsutsumi et al. | |
| 2013/0312661 | A1 * | 11/2013 | Shih | B05C 3/005 118/500 |

FOREIGN PATENT DOCUMENTS

| | | | |
|---|---|---|---|
| GB | 1136187 | A | 12/1968 |
| JP | 057812 | A | 1/1993 |
| JP | 1125959 | A | 1/1999 |
| JP | 2005-161268 | A * | 6/2005 |
| JP | 2005161268 | A * | 6/2005 |
| JP | 2010212143 | A | 9/2010 |
| JP | 2011222296 | A | 11/2011 |
| JP | 2012146851 | A | 8/2012 |
| KR | 20030012351 | A | 2/2003 |
| WO | 2011108561 | A1 | 9/2011 |
| WO | 2011111899 | A1 | 9/2011 |
| WO | 2012092244 | A2 | 7/2012 |

OTHER PUBLICATIONS

Nanjundaswamy et al., "Electrode Fabrication for Li-Ion: Processing, Formulations and Defects During Coating", Proceedings of the 32nd Intersociety Energy Conversion Engineering Conference, vol. No. 1, pp. 42-45, Jul. 27-Aug. 1, 1997.

Xu et al., "Design and Fabrication of a High-Density Metal Microelectrode Array for Neural Recording", Sensors and Actuators, vol. No. 96, pp. 78-85, 2002.

PCT Search Report and Written Opinion issued in connection with corresponding PCT Application No. PCT/US2013/076443 on May 20, 2014.

Unofficial English Translation of Chinese Office Action issued in connection with corresponding CN Application No. 201310005454.3 on Oct. 10, 2015.

Unofficial English translation of Chinese Office Action issued in connection with corresponding CN Application No. 201310005454.3 on May 31, 2016.

* cited by examiner

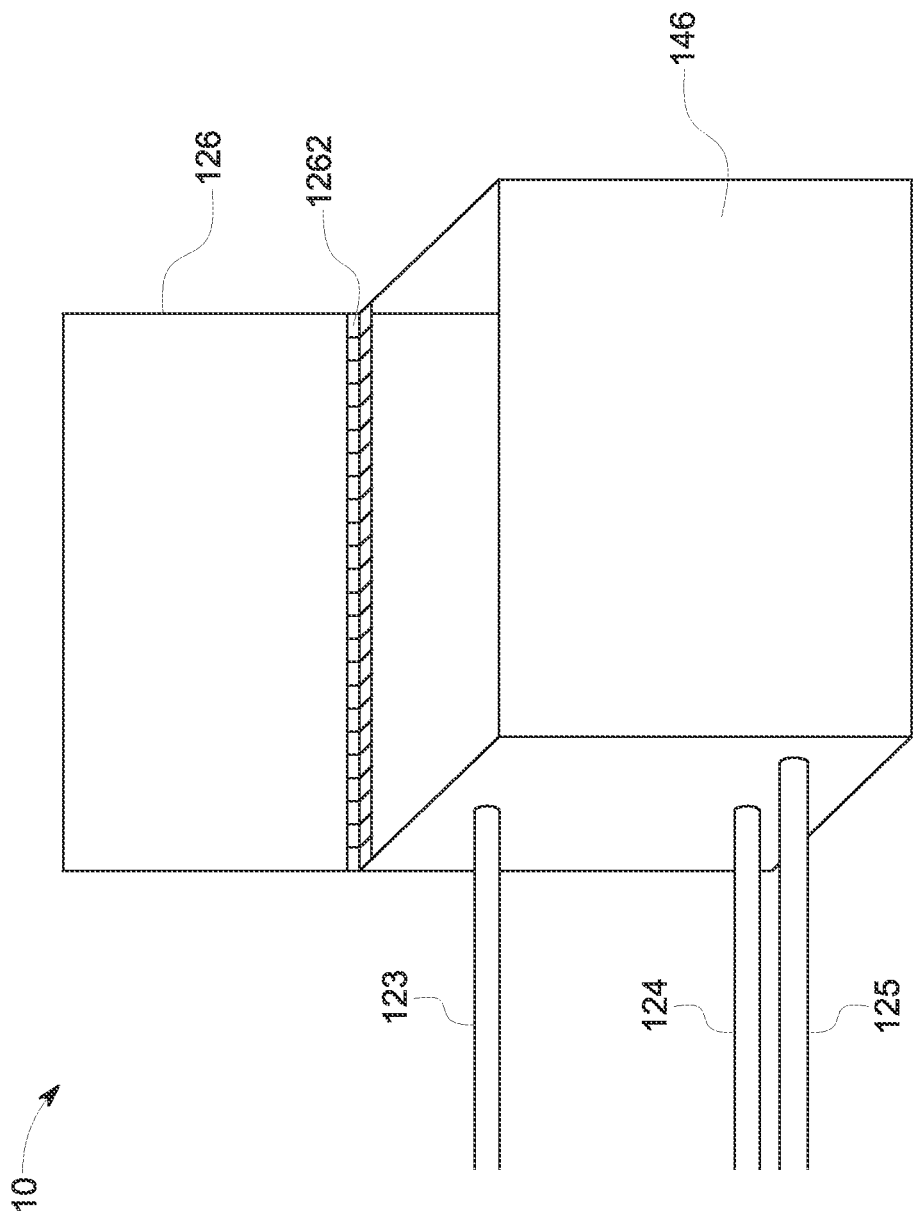

VACUUM DIP COATING APPARATUS

BACKGROUND

Embodiments of the invention relate generally to a coating apparatus and more particularly to a dip coating apparatus for applying a coating solution to coat workpieces.

Solution coatings are applied to surfaces or internal voids spaces by various coating techniques for different purposes. One of the more common techniques to do this in commercial operation is dip coating. Dip coating comprises submerging the workpiece to be coated in a coating solution, then either withdrawing the coated workpiece from the coating solution or withdrawing the coating solution away from the coated workpiece. This type of process is particularly suited for commercial operations that require complete and rapid coating of the workpiece.

However, conventional dip coating methods may be manual or semi-automatical operation processes. Therefore, some coating processes need operators to do manually or semi-automatic work, which reduce efficiency. Furthermore, the conventional dip coating processes are operated in a plant air environment basically, and the air in this environment may influence the quality of the coated workpieces.

For these and other reasons, there is a need for increasing efficiency and providing vacuum or inert gases environment during the dip coating process.

BRIEF DESCRIPTION

In accordance with an embodiment of the invention, a dip coating apparatus is provided. The dip coating apparatus includes a sealed case assembly for containing at least one workpiece to be coated; an air pump communicated with the sealed case assembly, for pumping air from the sealed case assembly and injecting air into the sealed case assembly; and a coating solution container containing a coating solution and communicated with the sealed case assembly, for injecting the coating solution to the sealed case assembly and retrieving the coating solution from the sealed case assembly.

In accordance with an embodiment of the invention, a dip coating method to dip coat an electrode by using the dip coating apparatus is provided. The method includes: providing an electrically conductive framework and an electrically conductive coating sheet; assembling the framework and the coating sheet to be an electrode substrate; putting the electrode substrate into the sealed case assembly of the dip coating apparatus; executing the dip coating process through the dip coating apparatus, wherein the coating solution container contains a coating solution having ion exchange capability; taking out a coated electrode from the dip coating apparatus; and solidifying the coated solution coated in the coating sheet.

DRAWINGS

These and other features, aspects, and advantages of the present invention will become better understood when the following detailed description is read with reference to the accompanying drawings in which like characters represent like parts throughout the drawings, wherein:

FIG. 13 is a schematic view of a dip coating apparatus according to yet another embodiment.

DETAILED DESCRIPTION

Embodiments of the invention relate to a dip coating apparatus for coating at least one workpiece in coating solution automatically or semi-automatically. The dip coating apparatus includes a sealed case assembly for containing at least one workpiece to be coated; an air pump communicated with the sealed case assembly, for pumping air from the sealed case assembly and injecting air into the sealed case assembly; and a coating solution container containing a coating solution and communicated with the sealed case assembly, for injecting the coating solution to the sealed case assembly and retrieving the coating solution from the sealed case assembly.

Embodiments of the present disclosure will be described with reference to the accompanying drawings. In the subsequent description, well-known functions or constructions are not described in detail to avoid obscuring the disclosure in unnecessary detail.

Unless defined otherwise, technical and scientific terms used herein have the same meaning as is commonly understood by one of ordinary skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items, and terms such as "front", "back", "bottom", and/or "top", unless otherwise noted, are merely used for convenience of description, and are not limited to any one position or spatial orientation. Moreover, the terms "coupled" and "connected" are not intended to distinguish between a direct or indirect coupling/connection between two components. Rather, such components may be directly or indirectly coupled/connected unless otherwise indicated.

Figure 1:
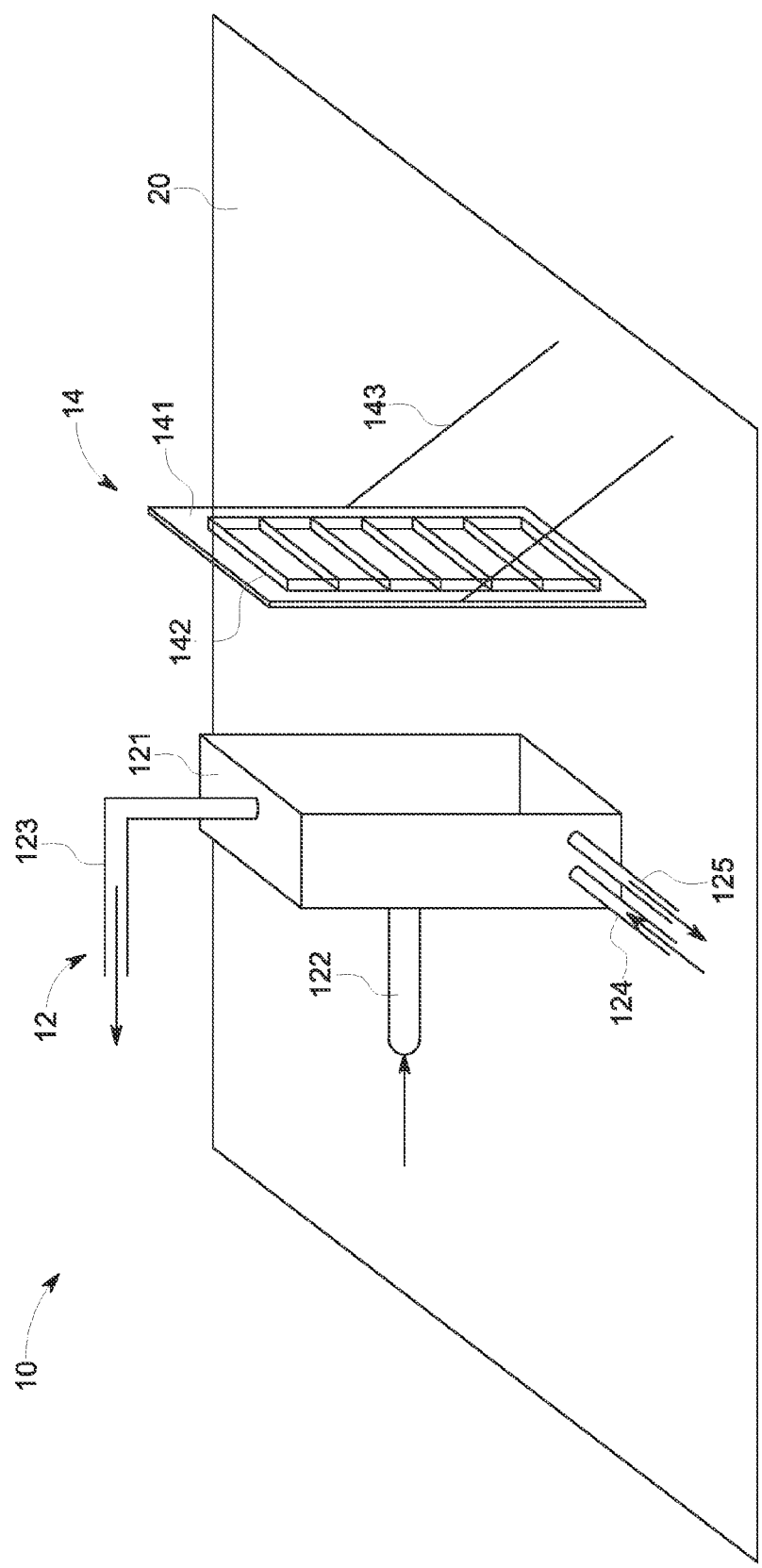
FIG. 1 is a schematic view of a dip coating apparatus according to one embodiment.

Referring to FIG. 1, a schematic view of a dip coating apparatus 10 according to one embodiment is shown. For example, the dip coating apparatus 10 can be used to coat chemical coating solution into an active carbon sheet to form an electrode element, but this example has no limitation to the utility of the dip coating apparatus 10. The dip coating apparatus 10 includes a first case element 12 and a second case element 14. The first case element 12 and the second case element 14 can be assembled together to become a sealed case assembly.

In the illustrated embodiment of FIG. 1, the first case element 12 includes a cubical case 121 without cover. The first case element 12 further includes a push-and-pull device such as one or more hydraulic cylinders 122 (here only one cylinder is shown) arranged on the back of the case 121, a first air pipeline 123 arranged on the top of the case 12 and through the inside of the case 121, a first liquid pipeline 124 and a second liquid pipeline 125 arranged on a downside of the case 121 and through the inside of the case 121. In other embodiments, the arrangement of the pipelines 123, 124, 125 can be changed according to different requirements, such as arranging the liquid pipelines 124 and 125 on the bottom of the case 121. The case 121 can be pushed and pulled by the hydraulic cylinders 122 on a platform 20. In other embodiments, for making the push-and-pull operation easier, the case 121 may further includes glide elements such as wheels (not shown) arranged on the bottom of the case 121.

The second case element 14 includes a rectangular cover 141 and a workpiece supporting element 142 attached on the cover 141. In the illustrated embodiment of FIG. 1, the cover 141 is transparent or translucent such as made of organic glass, which can monitor the workpiece supporting element 142 from the back of the cover 141. In other embodiments, the cover 141 also can be opaque, such as made of stainless steel, and the case 121 may be made of transparent or translucent material. The second case element 14 may further include a bracket configuration such as two support bars 143 used to support the cover 141 to be positioned on the platform 20. In other embodiments, the cover 141 may be directly positioned on the platform 20, for example vertically jointing on the platform 20. As an example in FIG. 1, the workpiece supporting element 142 is a rectangular-shaped cage used to support the workpiece (not shown) to be coated. In other embodiments, the shape of the workpiece supporting element 142 may vary according to the dimensions of the actual workpiece to be coated. Also, the support element 142 can be disassembled from the cover 141, and another workpiece support element 142 can be re-assembled on the cover 141. Furthermore, in other embodiments, the workpiece support element 142 also can be arranged inside of the case 121 if needed, for example when the workpiece support element 142 is easier to be arranged in the case 121 than arranged on the cover 141. And in some embodiments, the workpiece support element 142 can be deleted if the workpiece can be directly arranged in the case 121.

Figure 2:
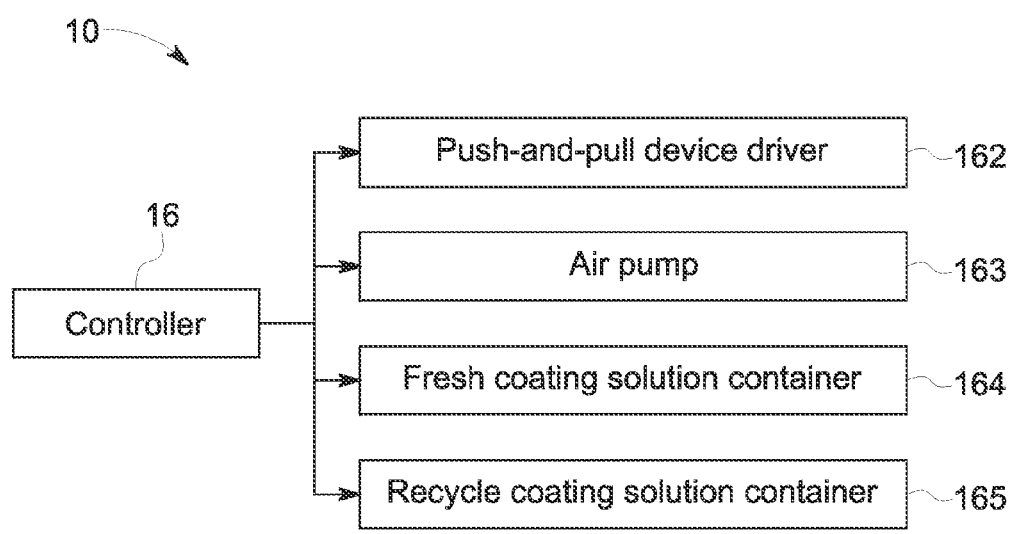
FIG. 2 is schematic view of a control block of the dip coating apparatus of FIG. 1, according to one embodiment.

Referring to FIG. 2 continued, the dip coating apparatus 10 further includes a controller 16, a push-and-pull device driver 162, an air pump 163, a fresh (or first) coating solution container 164, and a recycle (or second) coating solution container 165, which are all not shown in FIG. 1. In some embodiments, the first and second coating solution containers 164 and 165 can be two different containing spaces of a coating solution container. The controller 16 is used to control the push-and-pull device driver 162, the air pump 163, the fresh coating solution container 164, and the recycle coating solution container 165 automatically or semi-automatically. In detail, the push-and-pull device driver 162 is used to drive the hydraulic cylinders 122 to push and pull the first case element 12 on the platform 20 according to control commands from the controller 16. The air pump 163 is used to pump air from the case 121 assembled with the cover 141, and inject air therein according to control commands from the controller 16. The fresh coating solution container 164 is used to contain fresh coating solution and inject the fresh coating solution into the case 121 assembled with the cover 141 according to control commands from the controller 16. The recycle coating solution container 165 is used to retrieve the used coating solution from the case 121 assembled with the cover 141 according to control commands from the controller 16. The above control commands may be predetermined programs stored in the controller 16 or instant commands input by operators according to different process needs.

Figure 3:
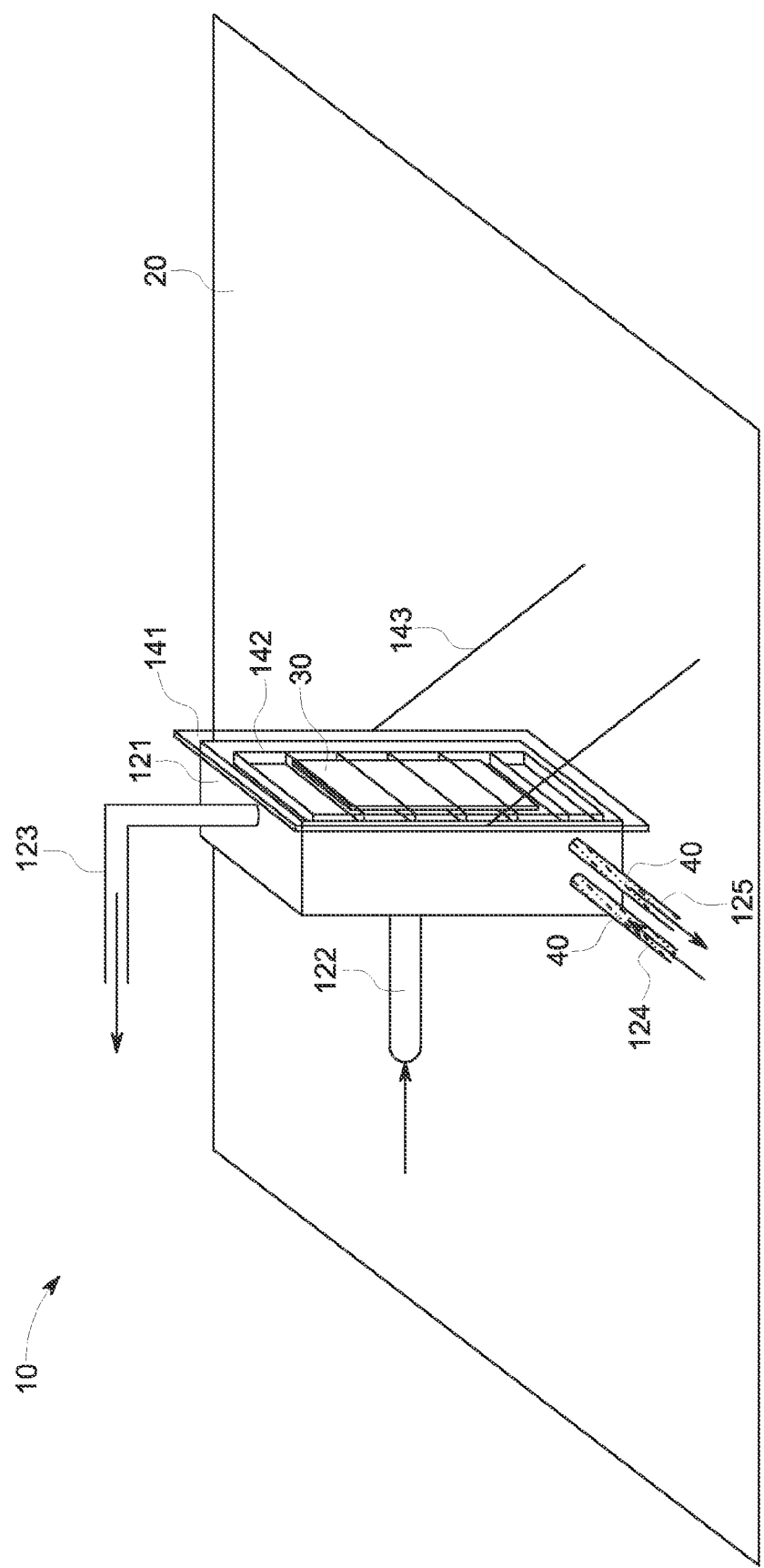
FIG. 3 is a schematic view of a coating status of the dip coating apparatus of FIG. 1.

Referring to FIG. 3, a schematic view of a coating status of the dip coating apparatus 10 is shown. Before coating, a workpiece 30 to be coated is arranged in the workpiece supporting element 142, or directly arranged in the case 121 in some embodiments. After that, the case 121 is pushed by the hydraulic cylinders 122 along the cover 141 until the case 121 is covered by the cover 141 tightly, to become the sealed case assembly. In other embodiments, for making the case 121 assembled with the cover 141 have good seal performance, the brims of the case 121 may further include a circle of sealing strip (not shown). When the case 121 assembled with the cover 141 is under the sealed status, the controller 16 controls the air pump 163 to pump air from the case 121 to create a vacuum environment inside of the case 121 and meanwhile controls the fresh coating solution container 164 to inject fresh coating solution 40 into the case 121, until the coating solution 40 excess the top point of the workpiece 30, or excess more. After a predetermined coating time, for example one hour, a first time of coating process is finished. And then, the controller 16 controls the air pump 163 to inject air into the case 121 and meanwhile controls the recycle coating solution container 165 to receive the used coating solution 40 from the case 121, until all of the used coating solution 40 are flowed into the recycle coating solution container 165. In unlimited embodiments, the vacuum degree in the sealed case assembly is higher than −0.1 Mpa, but the higher the better. The high vacuum degree in the sealed case assembly can make the air bubble is removed from the workpiece 30 fast and efficiently. The optimum degree of vacuum will be determined by the nature of the coating solution and substrate to create the desired degree of coating in the workpiece.

For different sizes and shapes of workpieces, the times of the coating process may be different and the coating time may be also different. When the workpiece 30 can be coated thoroughly with only one coating process, the controller 16 controls the hydraulic cylinders 122 to pull the case 121 separated from cover 142. And then, the coated workpiece 30 can be taken from the workpiece supporting element 142. Thus, the whole coating process is finished. When the workpiece 30 needs be coated by more than one coating process, the controller 16 controls the fresh coating solution container 164, the recycle coating solution container 165, and the air pump 163 again, to coat the workpiece 30 for more than one time according to above mentioned process, and thus not described again. After that, the coated workpiece 30 can be taken from the workpiece supporting element 142. Thus, the whole coating process is finished. Due to the dip coating apparatus 10 which operates automatically or semi-automatically to coat the workpiece 30 according to predetermined programs or instant commands input, the coating efficiency is extremely increased. Furthermore, the controller 16 controls the whole coating process based on the predetermined parameters, such as coating time, and operated in a vacuum environment which can increase accuracy, and thus can obtain a high quality of coated workpiece 30.

In other embodiments, the first air pipeline 123 and the corresponding air pump 163 can be deleted, and just defining a through hole (not shown) in the top of the case 121 is also OK in some coating processes. And, if the workpiece 30 needs only one time of coating process, the second liquid pipeline 125 and the second coating solution container 165 also can be omitted, and just using the first liquid pipeline 124 to retrieve the used coating solution from the case 121 to the first coating solution container 164. The dip coating apparatus 10 also can be adjusted according to needs, the following paragraphs will describe some other exemplary embodiments to show some different configurations, but there is no limitation.

Figure 4:
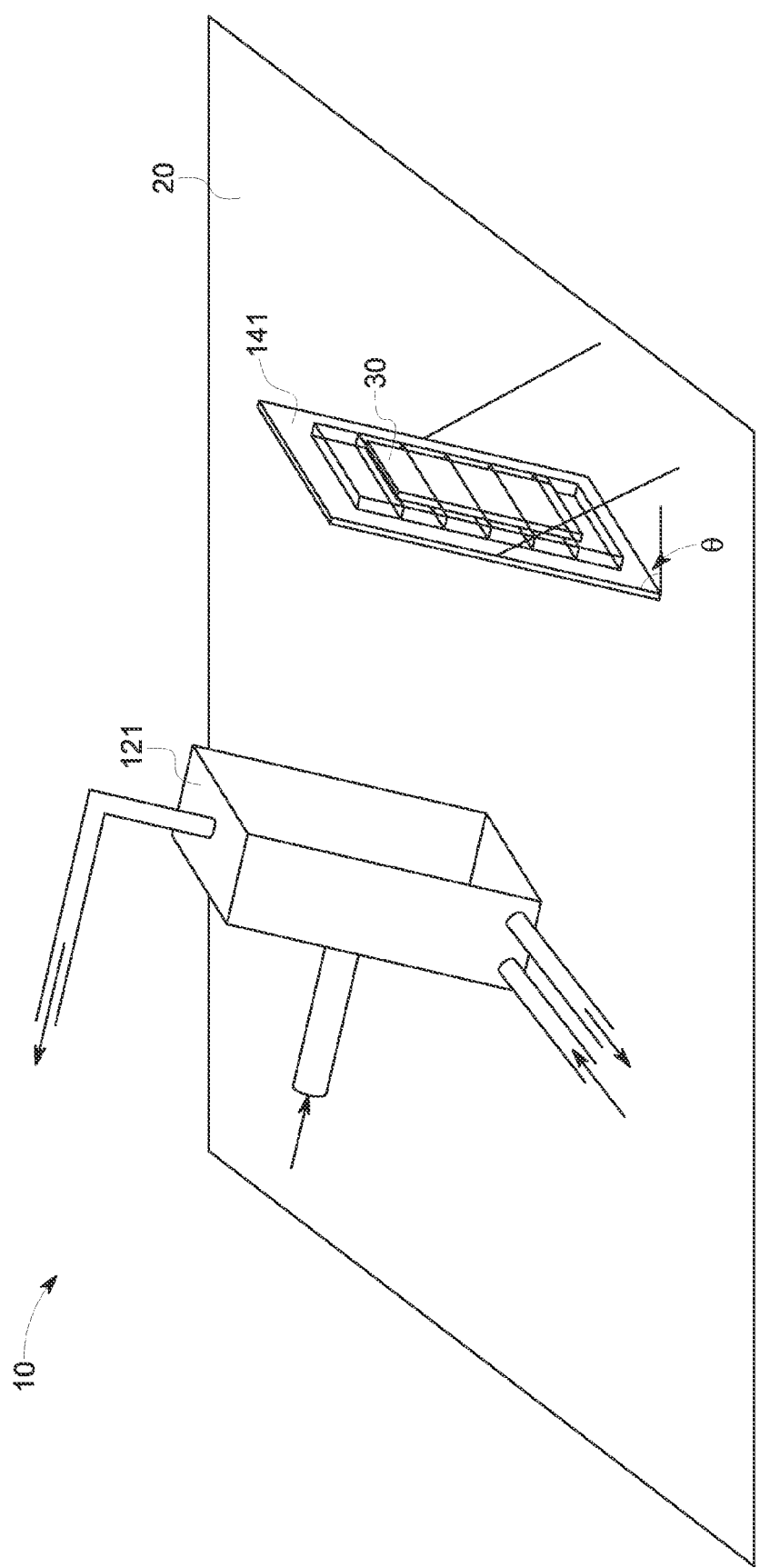
FIG. 4 is a schematic view of a dip coating apparatus according to another embodiment.

Referring to FIG. 4, a schematic view of a dip coating apparatus 10 according to another embodiment is shown. Compared with the embodiment of FIG. 1, this embodiment only adjusts the arrangement of the cover 141 and the case 121 on the platform 20. In details, the cover 141 is arranged on the platform 20 with a slant angle θ, such as 75 degrees, which can at least easily support the workpiece 30 and easily fix the cover 141 on the platform 20. Accordingly, the case 121 is arranged face to the cover 141, maybe fixed by other configuration, for example an appropriate bracket (not shown).

Figure 5:
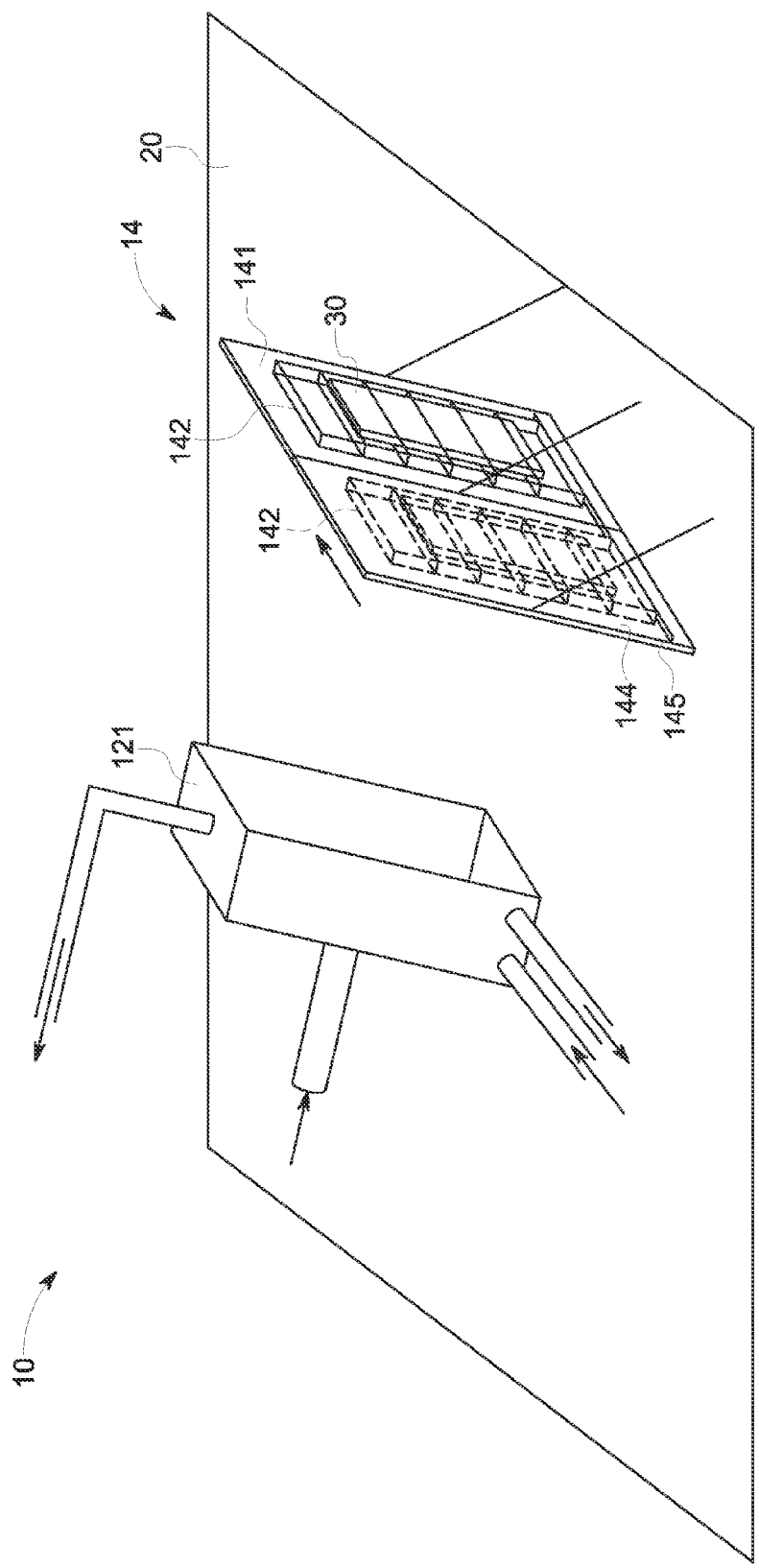
FIG. 5 is a schematic view of a dip coating apparatus according to yet another embodiment.

Referring to FIG. 5, a schematic view of a dip coating apparatus 10 according to yet another embodiment is shown. Compared with the embodiment of FIG. 4, the second case element 14 of this embodiment further includes an extending board 144 arranged on one side of the cover 141, and a slider 145 mounted on the bottom of the cover 141 and the extending board 144. The workpiece supporting element 142 can be pushed from the extending board 144 to the cover 141, and pulled from the cover 141 to the extending board 144 through the sliding operation of the slider 145. Thus, the operator can easily arrange the workpiece 30 on the cover 141. In some embodiments, the cover 141 and the extending board 144 can be an integrated together, such as a big integrated organic glass.

Figure 6:
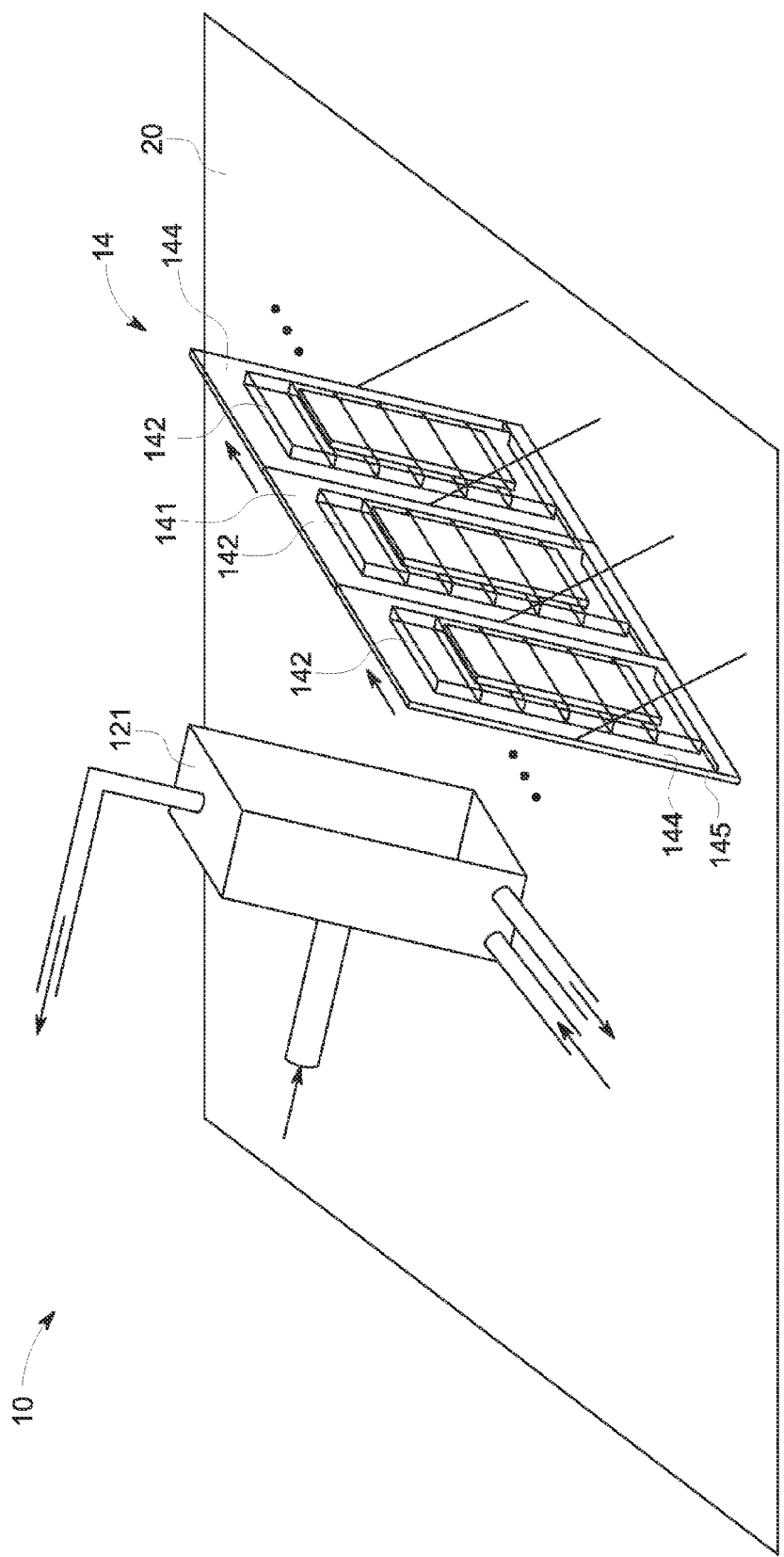
FIG. 6 is a schematic view of a dip coating apparatus according to yet another embodiment.

Referring to FIG. 6, a schematic view of a dip coating apparatus 10 according to yet another embodiment is shown. Compared with the embodiment of FIG. 5, the second case element 14 of this embodiment further includes multiple extending boards 144 arranged on two sides of the cover 141, and a slider 145 mounted on the bottom of the cover 141 and those extending boards 144 (here only show two extending boards). The slider 145 also can be controlled by the controller 16 in some embodiments. When there are many workpieces 30 need to be coated, these workpieces 30 can be arranged on the former extending boards 144 before coating. During the coating process, when one of the workpieces 30 is coated, the controller 16 controls the slider 145 to move next un-coated workpiece 30 from the former extending boards 144 to the cover 141 and move the coated workpiece 30 from the cover 141 to the later extending board 144, and repeat the above process until all of the workpieces 30 are coated, which can further increase efficiency, especially for coating large numbers of workpieces.

Figure 7:
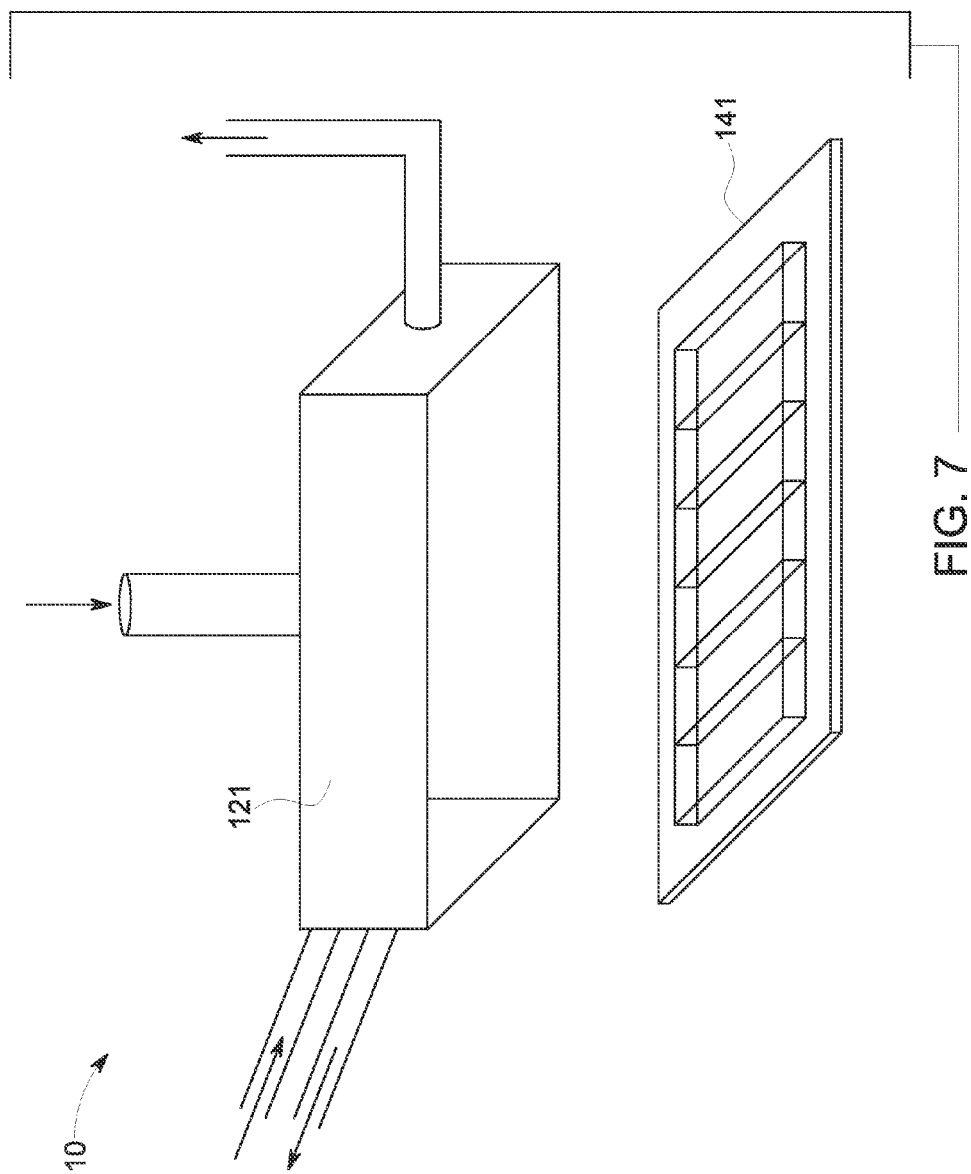
FIG. 7 is a schematic view of a dip coating apparatus according to yet another embodiment.

Referring to FIG. 7, a schematic view of a dip coating apparatus 10 according to yet another embodiment is shown. Compared with the embodiment of FIG. 1, this embodiment also only adjusts the arrangement of the cover 141 on the platform 20 (not shown). In detail, the cover 141 is flat arranged on the platform 20, which can omit the support bars 143. Accordingly, the case 121 is arranged face to the cover 141, maybe fixed by other configuration (not shown). Due to the cover 141 being arranged flat, the workpiece supporting element 142 can be deleted, and the workpiece is put directly on the cover 141 in some embodiments.

Figure 8:
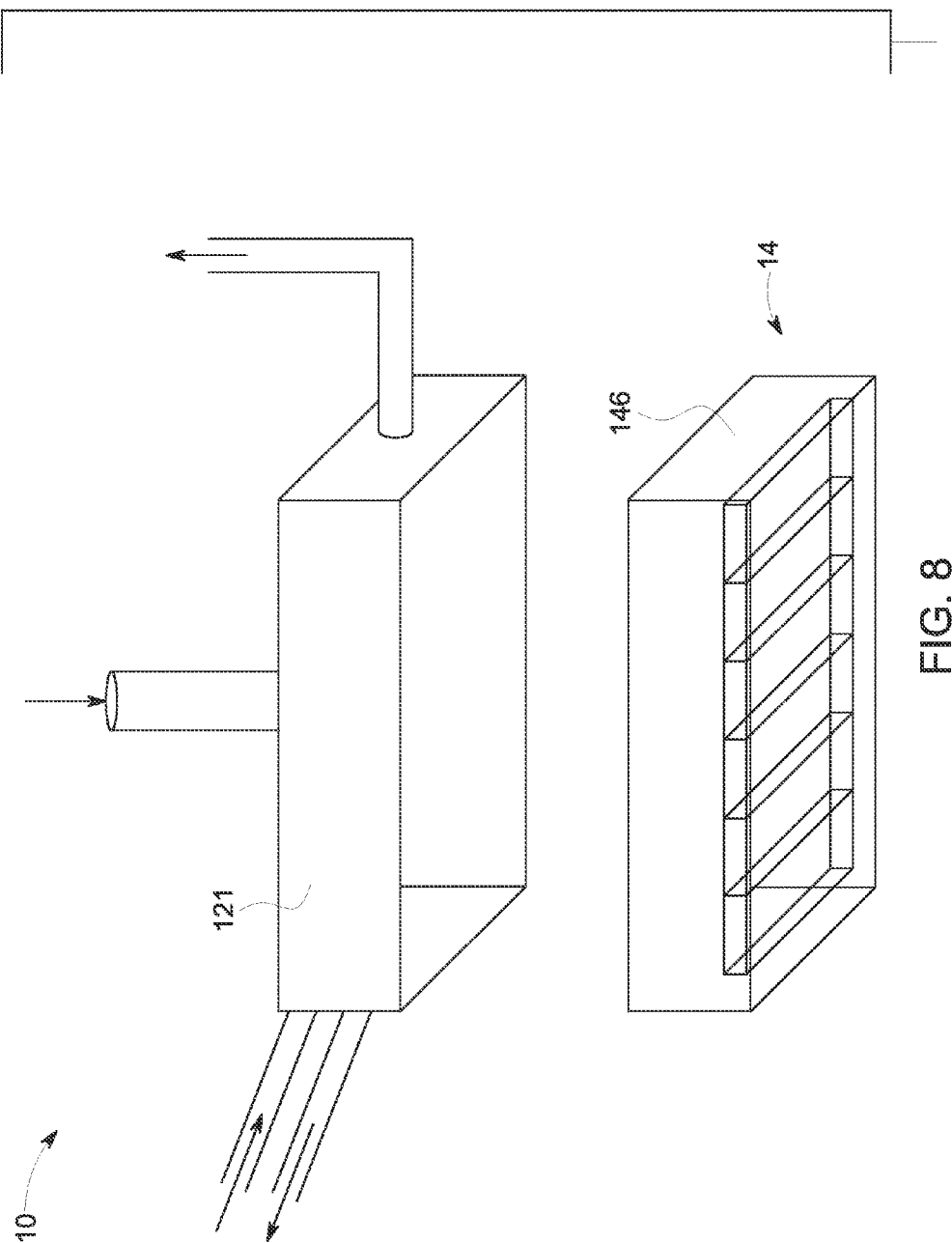
FIG. 8 is a schematic view of a dip coating apparatus according to yet another embodiment.

Referring to FIG. 8, a schematic view of a dip coating apparatus 10 according to yet another embodiment is shown. Compared with the embodiment of FIG. 7, the second case element 14 of this embodiment includes a case 146 without cover instead of the cover 141. The case 146 also can assembled with the case 121 to become a sealed case assembly, which may increase the volume thereof and can contain a large workpiece or multiple workpieces.

Figure 9:
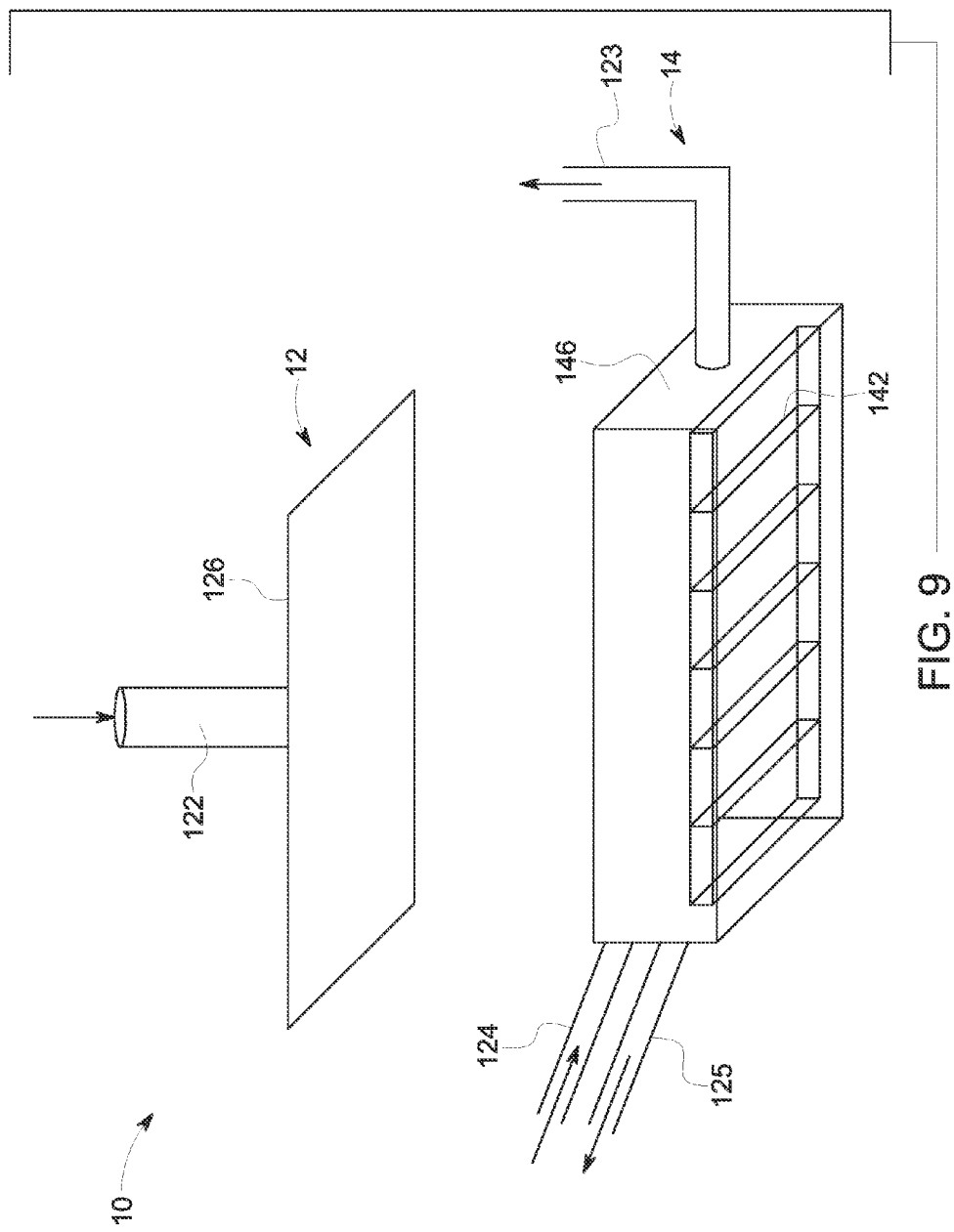
FIG. 9 is a schematic view of a dip coating apparatus according to yet another embodiment.

Referring to FIG. 9, a schematic view of a dip coating apparatus 10 according to yet another embodiment is shown. Compared with the embodiment of FIG. 8, the case 121 is replace by a cover 126, and the pipelines 123, 124, and 125 are re-arranged on the case 146 having the similar functions mentioned above. The push-and-pull device 122 is arranged on the cover 126 to push and pull the cover 126, to assemble and disassemble the sealed case assembly. The coating process is similar to the embodiment of FIG. 1, and thus not described again.

Figure 10:
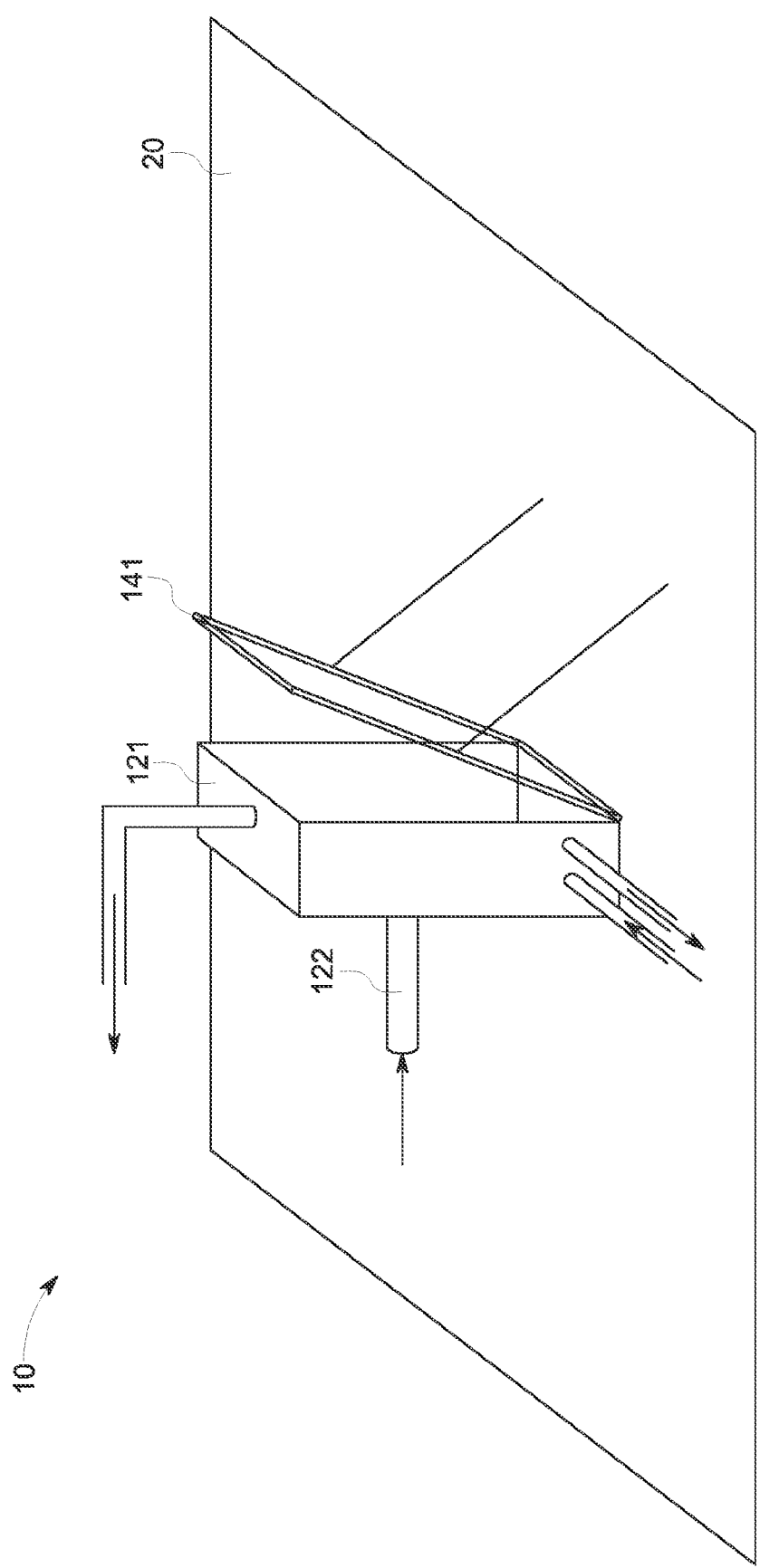
FIG. 10 is a schematic view of a dip coating apparatus according to yet another embodiment.

Referring to FIG. 10, a schematic view of a dip coating apparatus 10 according to yet another embodiment is shown. Compared with above embodiments, this embodiment connects one side of the case 121 to one side of the cover 141 together in advance, for example by hinge configuration mode. For easily showing this embodiment, the workpiece supporting element 142 is not shown. This embodiment may improve operation facility for the push-and-pull device 122.

Figure 11:
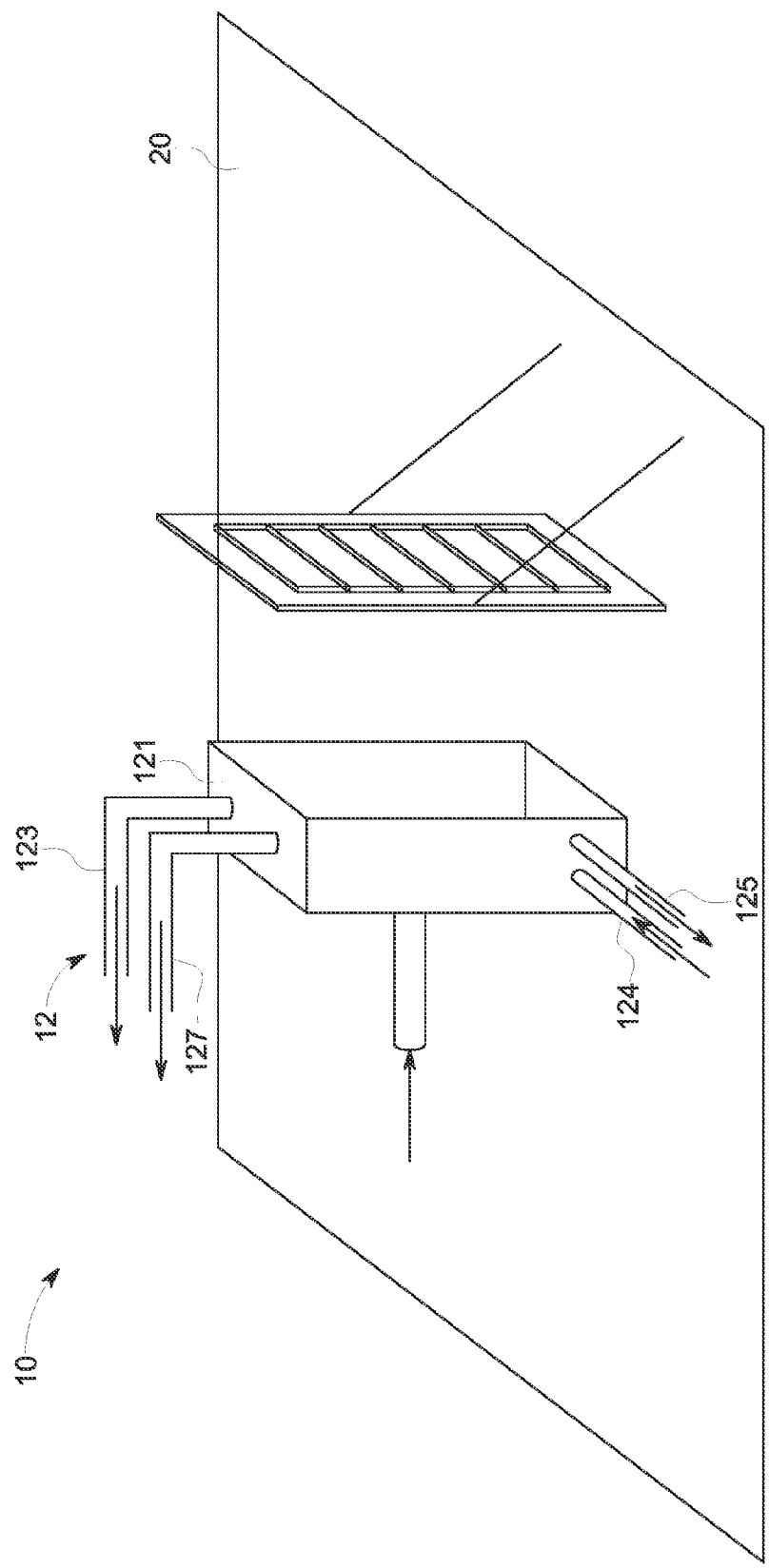
FIG. 11 is a schematic view of a dip coating apparatus according to yet another embodiment.
Figure 12:
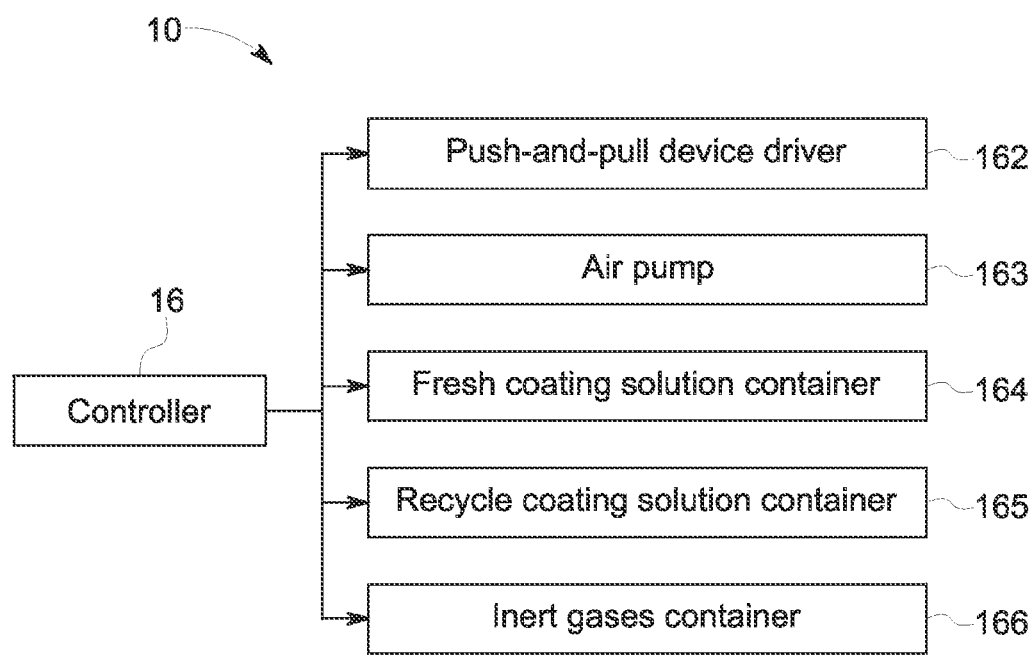
FIG. 12 is a schematic view of a control block of the dip coating apparatus of FIG. 11, according to one embodiment.

Referring to FIG. 11, a schematic view of a dip coating apparatus 10 according to yet another embodiment is shown. Compared with the embodiment of FIG. 1, the first case element 12 of this embodiment further includes a second air pipeline 127 arranged on the case 121 and through the inside of the case 121. Referring to FIG. 12 continued, a schematic view of a control block of the dip coating apparatus 10 of FIG. 11 is shown. Comparing this control block with the embodiment of FIG. 2, the control block further includes an inert gases container 166. In detail, after the first time the coating process is finished and the second time the coating process begins, the controller 16 controls the inert gases container 166 to inject inert gases, such as nitrogen, into the case 121 and meanwhile controls the recycle coating solution container 165 to receive the used coating solution 40 from the case 121, which can avoid air to pollute the workpiece 30 in the later coating processes. In other embodiments, the dip coating apparatus 10 may vary or add other functions according to different requirements, such as temperature and humidity control to the coating solution.

Referring to FIG. 13, a schematic view of a dip coating apparatus 10 according to yet another embodiment is shown. Compared with the embodiment of FIG. 9, the push-and-pull device 122 is deleted, and the cover 126 (first case element) is hinged at one side of the case 146 (second case element) through a hinge 1262. The cover 126 can be covered on the case 146 through the hinge 1262, which becomes a sealed case assembly. To provide the sealed case assembly with good seal performance, the brims of the case 146 may include a circle of sealing strip (not shown), and may further include a fix element (not shown) for fixing the cover 126 on the case 146.

Figure 14A:
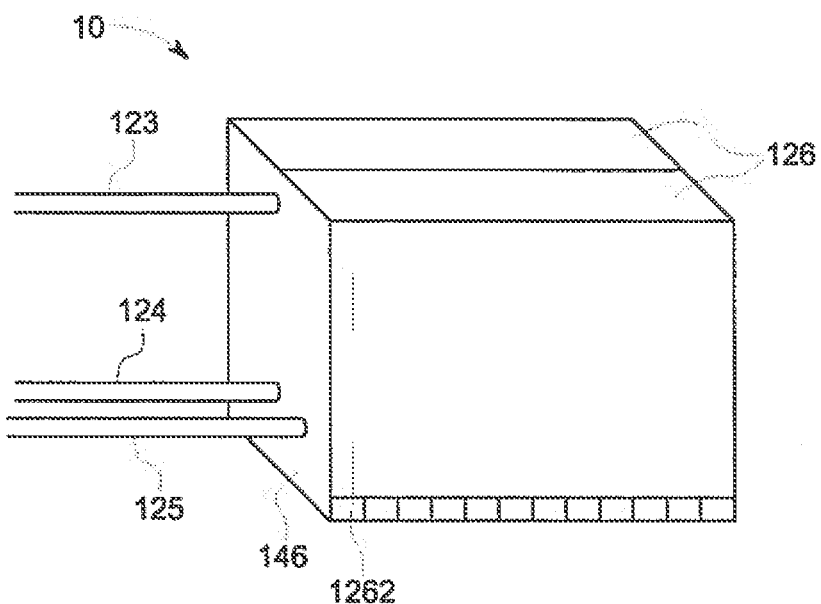
FIGS. 14A and 14B are two schematic views at different statuses of a dip coating apparatus according to yet another embodiment.
Figure 14B:
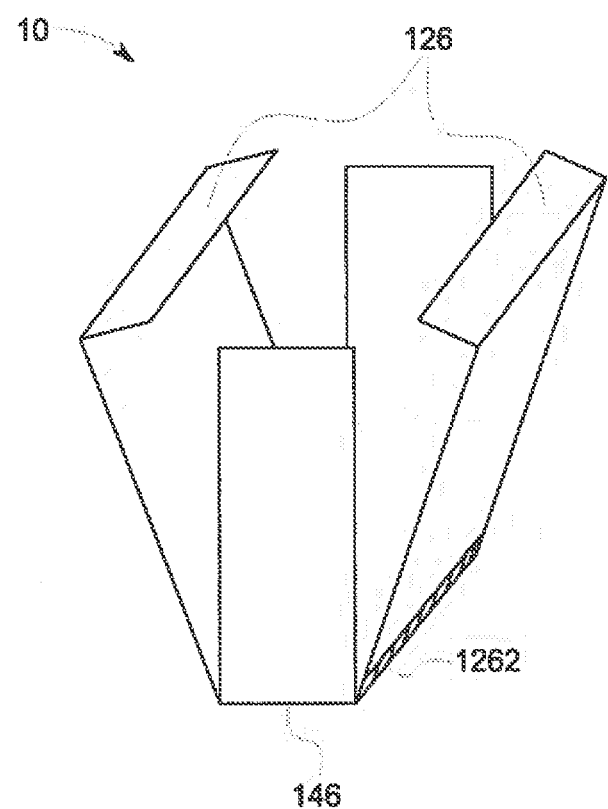

Referring to FIGS. 14A and 14B, two schematic views at different statuses of a dip coating apparatus 10 according to yet another embodiment is shown. Compared with the embodiment of FIG. 13, the cover 126 (first case element) includes two L-shaped boards, and the case 146 (second case element) includes a U-shaped board. The two L-shape boards are respectively hinged at two bottom sides of the U-shaped board through two hinges 1262. The cover 126 can be covered on the case 146 through the two hinges 1262, which becomes a sealed case assembly. For easily showing, the pipelines 123, 124, 125 are not shown in FIG. 14B. The two above embodiments of FIG. 13 and FIGS. 14A and 14B only show two examples of the hinged configurations of the dip coating apparatus 10, in other embodiments, the cover 126 and the case 146 can be changed to other shapes and other hinged configurations.

The above embodiments and other un-shown embodiments of the dip coating apparatus 10 all can be used to dip coat a workpiece or a group of workpieces automatically or semi-automatically, which can increase efficiency. The following paragraphs will give an example of a method for manufacturing an electrode by using the dip coating apparatus 10.

Figure 15:
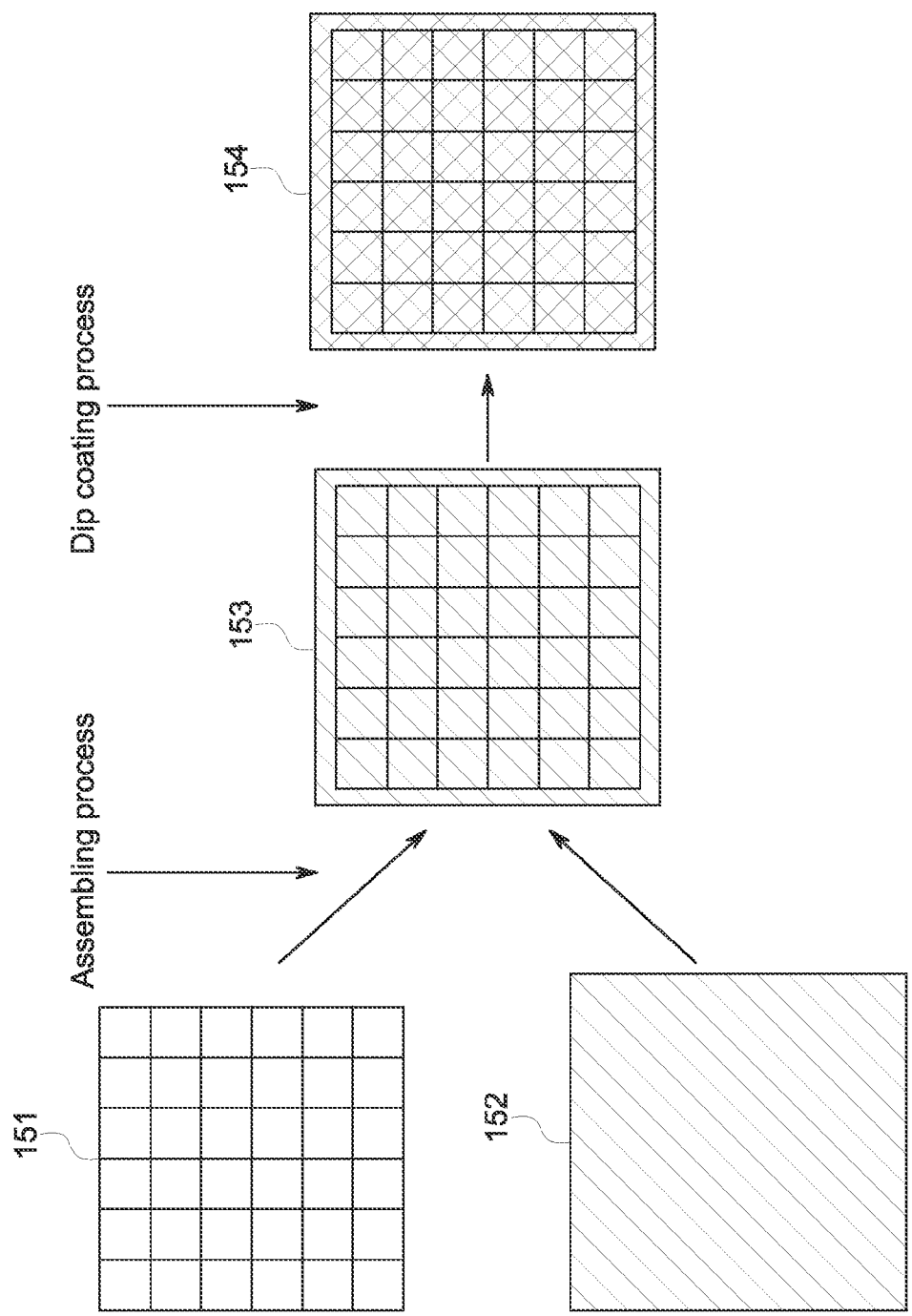
FIG. 15 is a schematic view of manufacturing an electrode, according to one embodiment.
Figure 16:
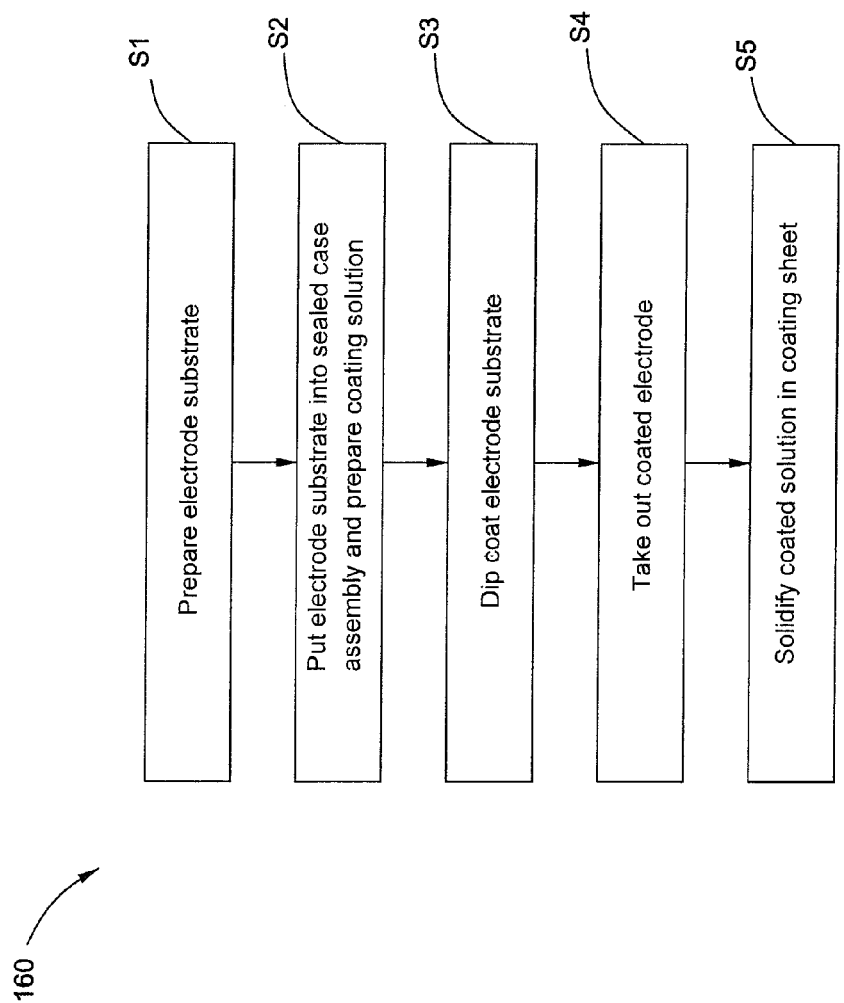
FIG. 16 is a flowchart of a method of manufacturing the electrode of FIG. 15, according to one embodiment.

Referring to FIG. 15, a schematic view of manufacturing an electrode 154, according to one embodiment is shown. As an example, the electrode 154 may be applied in water desalination technology field. Referring to FIG. 16 continued, a flowchart of a method 160 of manufacturing the electrode 154 of FIG. 15, according to one embodiment is shown. In the illustrated embodiment of FIG. 16, the method 160 includes the following steps.

In step S1, an electrode substrate 153 (see FIG. 15) is prepared in advance. In detail, the electrode substrate 153 includes a conductive layer 151 and a coating sheet 152. The conductive layer 151 is used to provide an electrically conductive framework to electrically connect to an external electrical lead. For example, the conductive layer 151 may be a metal mesh made of titanium, platinum, iridium, or rhodium, etc. In other embodiments, the conductive layer 151 may be a metal plate, a metal foil, etc. When the electrode substrate 153 uses the metal mesh instead of a whole metal plate, this kind of electrode substrate 153 can have a reduced cost. The coating sheet 152 is used to provide an electrically conductive coating medium attached on the conductive layer 151. For example, the coating sheet 152 may be an active carbon sheet or the like, such as carbon aerogels, carbon nanotubes, carbon cages, carbon fiber, porous carbon, porous mesocarbon microbeads sheets, etc. The conductive layer 151 and the coating sheet 152 can be assembled together as the electrode substrate 153 through appropriate fabricating method, for example through calendering method executed by a calender machine, or through other appropriate methods, such as sputtering method, spraying method, spin-coating method, or printing method, etc.

In step S2, the electrode substrate 153 is put into the sealed case assembly of the dip coating apparatus 10, and the coating solution is prepared in the coating solution container 164 (see FIG. 2) in advance. According to different requirements, the operator can choose an appropriate type of the above embodiments of the dip coating apparatus 10, but not limited to them. Furthermore, an appropriate coating solution is selected to dip coat the electrode substrate 153 in the coating solution container 164 of the dip coating apparatus 10. The coating solution is used to solidify the coating sheet 152 on the conductive layer 151, and further provide ion exchange capability therein. In non-limiting embodiments, the coating solution may include sulfonates, quaternary ammonium salts, and water. The concentration of the sulfonates and the quaternary ammonium salts may be greater than 10% in the water solution, and in an embodiment, the sulfonates and the quaternary ammonium salts may be about 50% in the water solution. In other embodiments, the sulfonates also can be other cation selective materials, such as sulfonic group, carboxylic group, phosphate group, or combinations thereof. The quaternary ammonium salts can be other anion selective materials, such as amine group, pyridinium group, or combinations thereof. The amine group may include primary amine, secondary amine, tertiary amine, and/or quaternary amine.

In step S3, the dip coating apparatus 10 is executed to dip coat the electrode substrate 153. The detailed coating process has already been disclosed above.

In step S4, after the above dip coating process is finished, a coated electrode 154 (see FIG. 15) is taken out from the dip coating apparatus 10. Namely, the coating solution is coated in the internal voids spaces of the coating sheet 152 together with the conductive layer 151, which becomes the electrode 154 through the dip coating process. In some embodiments, the electrode 154 or other workpiece may be satisfied according to their quality requirements. In some other embodiments, the coated electrode 154 may need further treatment, such as the step S5.

In step S5, the coated electrode 154 is further treated, for solidifying the coated solution in the coating sheet 152. For example, providing a heating treatment to the coated electrode 154, or just put the coated electrode 154 in room temperature environment for a long time. This process may produce a finished, qualified electrode 154.

Furthermore, before step S5, finishing the electrode 154, a preprocessing step may be applied to further treat the electrode 154. For example, an applicable preprocessing step is a squeezing process to remove excess coating solution from the coated electrode 154 before heat treatment.

Other descriptions of the electrode and its manufacturing methods can be found, for example, in a U.S. patent application Ser. No. 12/511,193, filed Jul. 29, 2009, "Bipolar electrode and supercapacitor desalination device, and methods of manufacture," to Liping Zheng et al, which has the same assignee as this application and the contents of which are hereby incorporated by reference herein in their entirety, and also in a U.S. patent application Ser. No. 12/981,595, filed Dec. 30, 2010, "Simultaneous polymerization of two vinyl monomer mixtures to opposite faces of a flat porous substrate," to Russell James MacDonald et al, which has the same assignee as this application and the contents of which are hereby incorporated by reference herein in their entirety.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

The invention claimed is:

1. A dip coating apparatus, comprising:
a sealed case assembly for containing at least one workpiece to be coated;
an air pump communicated with the sealed case assembly, for pumping air from the sealed case assembly and injecting air into the sealed case assembly;
a fresh coating solution container containing a coating solution and communicated with the sealed case assembly through a first liquid pipeline, for injecting the coating solution to the sealed case assembly;
a recycle coating solution container communicated with the sealed case assembly through a second liquid pipeline, for retrieving the coating solution from the sealed case assembly;
a controller for controlling the air pump to pump air from the sealed case assembly and inject air into the sealed case assembly, controlling the flow of the coating solution from the fresh coating solution container to the sealed case assembly and controlling the flow of the coating solution from the sealed case assembly to the recycle coating solution container; and
a workpiece supporting element for supporting the at least one workpiece and arranged in the sealed case assembly;
wherein the sealed case assembly comprises: a first case element comprising a case without cover and a push-and-pull device for moving the case, and a second case element for assembling with the case to become the sealed case assembly, said second case element comprising a cover, an extending board arranged on one side of the cover, and a slider mounted on a bottom of the cover and the extending board for sliding the workpiece supporting element from the extending board to the cover, wherein the controller further controls the push-and-pull device to move the case to assemble and disassemble the sealed case assembly.

2. The dip coating apparatus of claim 1, wherein the cover or the case is made of transparent or translucent material.

3. The dip coating apparatus of claim 1, wherein at least one side of the cover is hinged to at least one side of the case.

4. The dip coating apparatus of claim 1, wherein the cover is vertically arranged on a platform, or is arranged on the platform with a slant angle, or is flatly arranged on the platform.

5. The dip coating apparatus of claim 1, wherein the first case element and the second case element are assembled together through hinged configurations.

6. The dip coating apparatus of claim 1, further comprising an inert gases container communicated with the sealed case assembly, wherein the controller controls the inert gases container to inject inert gases into the sealed case assembly.

7. The dip coating apparatus of claim 1, wherein a vacuum degree in the sealed case assembly is controlled higher than 0.1 Mpa.

8. A dip coating apparatus, comprising:
a sealed case assembly for containing at least one workpiece to be coated;
an air pump communicated with the sealed case assembly, for pumping air from the sealed case assembly and injecting air into the sealed case assembly;
a fresh coating solution container containing a coating solution and communicated with the sealed case assembly through a first liquid pipeline, for injecting the coating solution to the sealed case assembly;
a recycle coating solution container communicated with the sealed case assembly through a second liquid pipeline, for retrieving the coating solution from the sealed case assembly;
a controller for controlling the air pump to pump air from the sealed case assembly and inject air into the sealed case assembly, controlling the flow of the coating solution from the fresh coating solution container to the sealed case assembly and controlling the flow of the coating solution from the sealed case assembly to the recycle coating solution container; and
a workpiece supporting element for supporting the at least one workpiece and arranged in the sealed case assembly;
wherein the sealed case assembly comprises: a first case element comprising a case without cover and a push-and-pull device for moving the case, and a second case element for assembling with the case to become the sealed case assembly, said second case element comprising a cover, a plurality of extending boards arranged on two sides of the cover, and a slider mounted on a bottom of the cover and the plurality of extending boards for sliding the workpiece supporting element from a former extending boards to the cover, and sliding the workpiece supporting element from the cover to a later extending boards, wherein the controller further controls the push-and-pull device to move the case to assemble and disassemble the sealed case assembly.

9. The dip coating apparatus of claim 8, wherein the cover or the case is made of transparent or translucent material.

10. The dip coating apparatus of claim 8, wherein at least one side of the cover is hinged to at least one side of the case.

11. The dip coating apparatus of claim 8, wherein the cover is vertically arranged on a platform, is arranged on the platform with a slant angle, or is flatly arranged on the platform.

12. The dip coating apparatus of claim 8, wherein the first case element and the second case element are assembled together through hinged configurations.

13. The dip coating apparatus of claim 8, further comprising an inert gases container communicated with the sealed case assembly, wherein the controller controls the inert gases container to inject inert gases into the sealed case assembly.

14. The dip coating apparatus of claim 8, wherein a vacuum degree in the sealed case assembly is controlled higher than 0.1 Mpa.

* * * * *